United States Patent
Liu et al.

(10) Patent No.: US 11,465,298 B2
(45) Date of Patent: Oct. 11, 2022

(54) ROBOTIC HAND

(71) Applicant: UBTECH Robotics Corp, Shenzhen (CN)

(72) Inventors: Sicong Liu, Shenzhen (CN); Youjun Xiong, Shenzhen (CN); Hongyu Ding, Shenzhen (CN); Qidong Xu, Shenzhen (CN); Jianxin Pang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 837 days.

(21) Appl. No.: 16/370,891

(22) Filed: Mar. 30, 2019

(65) Prior Publication Data

US 2020/0206955 A1 Jul. 2, 2020

(30) Foreign Application Priority Data

Dec. 29, 2018 (CN) .......................... 201811636957.X

(51) Int. Cl.
*B25J 15/10* (2006.01)
*B25J 9/10* (2006.01)

(52) U.S. Cl.
CPC ............... *B25J 15/10* (2013.01); *B25J 9/102* (2013.01)

(58) Field of Classification Search
CPC .................................... B25J 15/10; B25J 9/10
See application file for complete search history.

(56) References Cited

U.S. PATENT DOCUMENTS

| | | | |
|---|---|---|---|
| 5,447,403 A * | 9/1995 | Engler, Jr. ........... | B25J 15/0009 294/111 |
| 2007/0035143 A1* | 2/2007 | Blackwell ................ | B25J 9/104 294/111 |
| 2011/0241368 A1* | 10/2011 | Kurita .................. | B25J 15/0009 700/254 |
| 2019/0152068 A1* | 5/2019 | Kondo ................... | B25J 15/022 |

FOREIGN PATENT DOCUMENTS

| | | | | |
|---|---|---|---|---|
| CN | 1621206 A | 6/2005 | | |
| CN | 101214660 A | 7/2008 | | |
| CN | 107081776 A | 8/2017 | | |
| CN | 107756426 A | * 3/2018 | ............ | B25J 13/088 |
| CN | 107756426 A | 3/2018 | | |

OTHER PUBLICATIONS

"Ielligent Astivev System for Elderly and Disabled Based on Speech and Gesture Control", Liu Ziyang et al., Shanxi Dianzi Jishu, 2018 Issue 5.

* cited by examiner

*Primary Examiner* — Kira Nguyen

(57) ABSTRACT

A robotic hand includes a palm, a thumb and four fingers that are connected to the palm; a first driving assembly to drive the thumb to rotate, a second driving assembly and a third driving assembly to respectively drive two of the four fingers to rotate; and a fourth driving assembly to drive the other two of the four fingers to rotate. The first driving assembly, the second driving assembly, the third driving assembly, and the fourth driving assembly are received within the palm.

9 Claims, 21 Drawing Sheets

ROBOTIC HAND

CROSS REFERENCE TO RELATED APPLICATIONS

This application claims priority to Chinese Patent Application No. 201811636957.X, filed Dec. 29, 2018, which is hereby incorporated by reference herein as if set forth in its entirety.

BACKGROUND

1. Technical field

The present disclosure generally relates to robots, and particularly to a robotic hand.

2. Description of Related Art

Manipulable hand-like apparatuses are utilized in several industries. One such apparatus is a multi-fingered robotic hand of a humanoid robot. The multi-fingered robotic hand includes a plurality of fingers capable of performing certain grasping operations. A finer of the robotic hand includes two or more phalanxes. In some conventional robotic hands, each phalanx is driven by an actuator and one robotic hand then needs ten or more actuators. One problem with such configuration is that the robotic hands are bulky due to the actuators.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
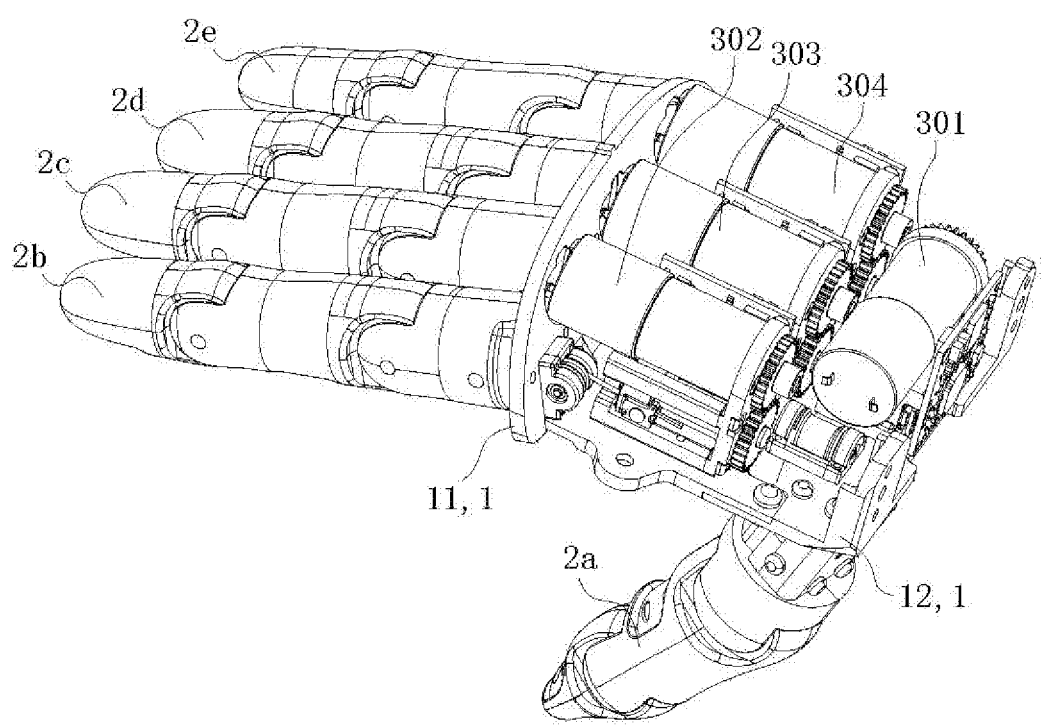
FIG. 1 is a schematic isometric view of a robotic hand according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 2:
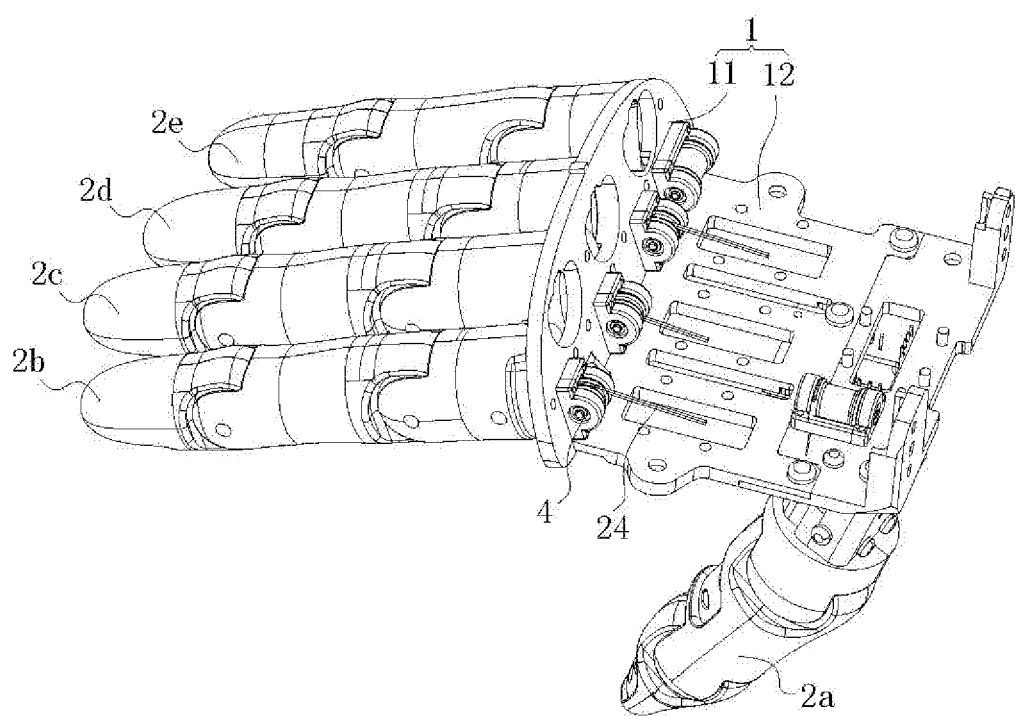
FIG. 2 is similar to FIG. 1 with certain components omitted for clarity.

Referring to FIGS. 1 and 2, in one embodiment, a robotic hand includes a palm, a thumb module and four finger modules that are connected to the palm. The thumb module includes a thumb 2a and a first driving assembly 301 to drive the thumb 2a. The four linger modules include four fingers, a second driving assembly 302 and a third driving assembly 303 to respectively drive two of the four fingers to rotate, and a fourth driving assembly 304 to drive the other two of the four fingers to rotate. The other two fingers are arranged adjacent to each other. The four fingers include an index finger 2b, a middle finger 2c, a ring finger 2d and a little finger 2e that are connected to the palm. The first driving assembly 301, the second driving assembly 302, the third driving assembly 303, and the fourth driving assembly 304 are received within the palm. The first driving assembly 301, the second driving assembly 302, the third driving assembly 303 and the fourth driving assembly 304 are all actuators, and output single degree-of-freedom motion, so that the driving assemblies have relatively simple structure, light weight and compact size. The first driving assembly 301 drives the thumb 2a to rotate. The second driving assembly 302 drives the index finger 2b to rotate, and the third driving assembly 303 drives the little finger 2e to rotate. The fourth driving assembly 304 drives the middle finger 2c and the ring finger 2d to rotate. In an alternative embodiment, the second driving assembly 302 may drive the index finger 2b to rotate, and the third driving assembly 303 may drive the middle finger 2c to rotate. The fourth driving assembly 304 may drive the ring finger 2d and the little finger 2e to rotate. In an alternative embodiment, the second driving assembly 302 may drive the ring finger 2d to rotate, and the third driving assembly 303 may drive the little finger 2e to rotate. The fourth driving assembly 304 may drive the index finger 2b and the middle finger 2c to rotate. In this way, two adjacent ones of the four fingers are driven by the same servo, which reduces the number of servos, further reduces the size of the driving assemblies, so that the driving assemblies can be arranged in the palm, and do not occupy space in an arm to which the robotic had is connected.

With such configuration, compared with some conventional robotic hands, the number of driving assemblies is reduced, and the space of the fingers is fully utilized, and the size of the driving assemblies is reduced and the driving assemblies do not occupy space in an arm to which the robotic had is connected.

Referring to FIG. 1, in one embodiment, the first driving assembly 301, the second driving assembly 302, the third driving assembly 303, and the fourth driving assembly 303 have the same configuration.

In an alternative embodiment, the second driving assembly 302, the third driving assembly 303, and the fourth driving assembly 304 have may have the same configuration. The configuration of the second driving assembly 302 is symmetric with respect to that of the first driving assembly 301, which facilitates utilization of space. In case of a humanoid robot having two hands, the second driving assembly, the third driving assembly, and the fourth driving assembly of the right hand may have the same configuration as the first driving assembly of the left hand. The second driving assembly, the third driving assembly, and the fourth driving assembly of the left hand may have the same configuration as the first driving assembly of the right hand.

Referring to FIG. 1, in one embodiment, he second driving assembly 302, the third driving assembly 303, and the fourth driving assembly 304 are arranged side by side in a width wise direction of the robotic hand. The first driving assembly 301 extends in a widthwise direction of the robotic hand and is located adjacent to the arm to which the robotic hand is connected. The second driving assembly 302, the third driving assembly 303 and the fourth driving assembly 304 are substantially parallel to one another, and perpendicular to the first driving assembly 301. The second driving assembly 302, the third driving assembly 303 and the fourth driving assembly 304 extend in a lengthwise direction of the robotic hand, with their output members facing the four fingers. The arrangement above can make full use of the space inside the palm.

Figure 3:
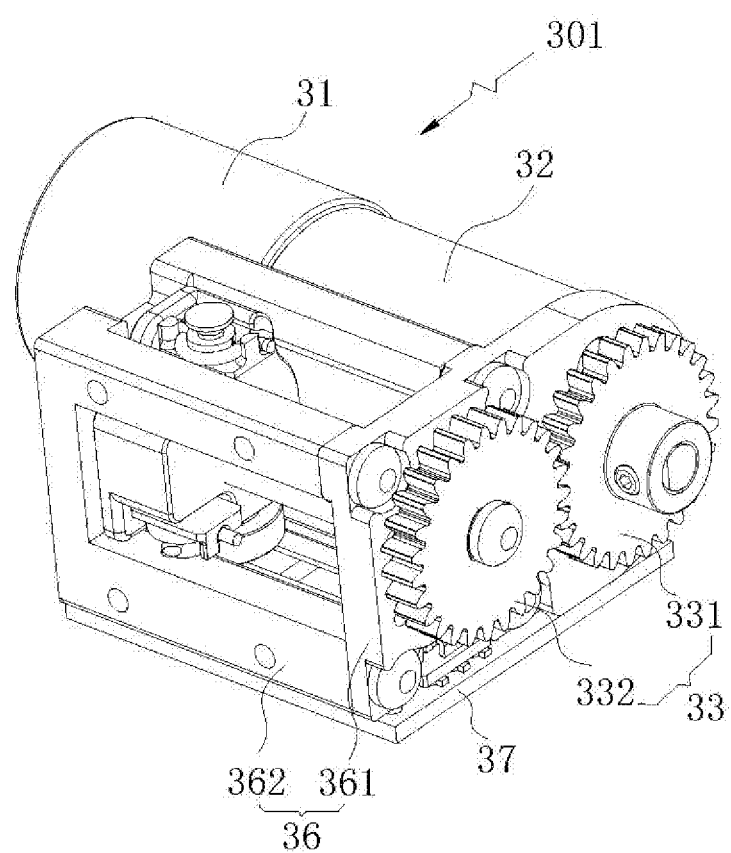
FIG. 3 is a schematic isometric view of a first driving assembly of the robotic hand of FIG. 1.
Figure 4:
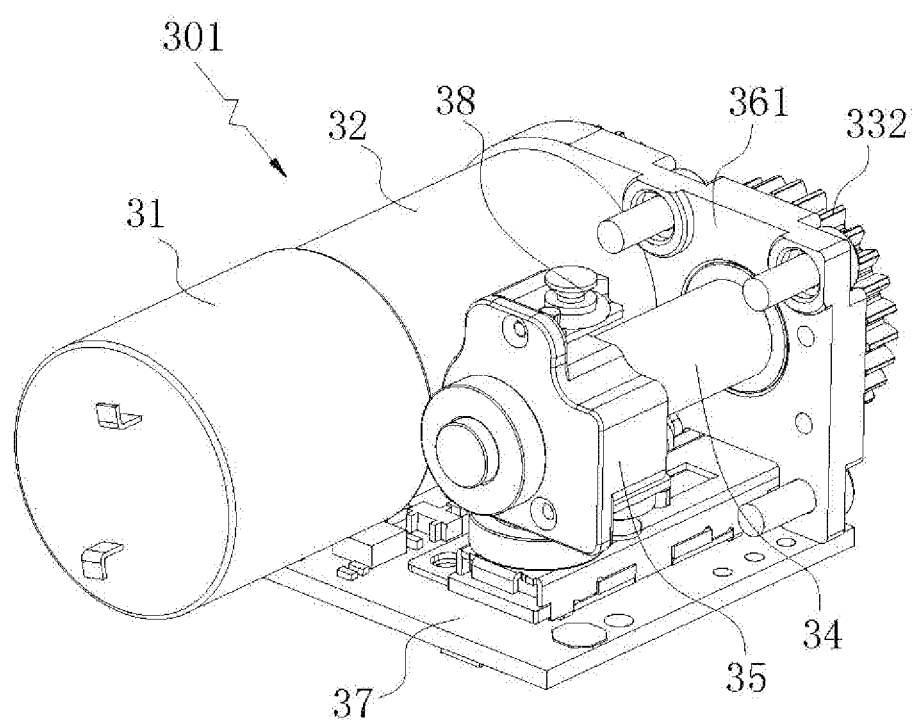
FIG. 4 is a schematic isometric view of the first driving assembly of FIG. 3, viewed from a different perspective, with certain components omitted for clarity.

Referring to FIGS. 3 and 4, in one embodiment, the first driving assembly 301 an actuator 31, a lead screw 34 connected to the actuator 31, and a nut 35 engaged with the lead screw 34. The thumb 2a is fixed to the nut 35. The nut 35 defines a through hole 3501. The actuator 31 is used to output rotational motion. The actuator 31 includes, but is not limited to, a stepping motor, a servo motor, and the like. The lead screw 34 is connected to an output shaft of the actuator 31, and the output shaft of the actuator 31 drives the lead screw 34 to rotate. The lead screw 34 then drives the nut 35 to move along the lead screw 34. The driving assemblies are connected to the fingers via pulling ropes. Specifically, the through hole 3501 of the nut of each of the second driving assembly 302 and the third driving assembly 303 allows an end of a corresponding pulling rope to pass through so that the pulling rope can be connected to a corresponding driving assembly. When the second driving assembly 302 and the third driving assembly 303 operate, the nuts thereof pull the pulling ropes to move and the pulling ropes then pull the index finger 2b and the middle finger 2c to rotate. For the fourth driving assembly, its nut defines two through holes 3501 that allow two pulling ropes to be connected to the nut. The two pulling ropes can pull the ring finger 2d and the little finger 2e to rotate. The lead screw 34 has a self-locking function. When the nut 35 is subjected to an external force, the screw 34 will not be rotated due to the frictional force of between the nut 35 and the lead screw 34, which prevents the thumb from rotating and protects the first driving assembly 301.

Referring to FIGS. 3 and 4, in one embodiment, the first driving assembly 301 further includes a transmission mechanism 33 between the actuator 31 and the lead screw 34. The transmission mechanism 33 includes a drive gear 331 connected to the output shaft of the actuator 31 and a driven gear 332 engaged with the drive gear 331 and fixed to the lead screw 34. The actuator 31 and the lead screw 37 are located at a same side of the transmission mechanism 33. The actuator 31 and the lead screw 34 can be arranged side by side and connected to each other by the transmission mechanism 33. As a result, the actuator 31 and the lead screw 34 are arranged according to the configuration of the internal space of the palm, and the driving mechanism can be arranged properly so that more driving mechanisms can be arranged in the palm. Optionally, one end of the lead screw 34 extends into the driven gear 332 and is securely connected thereto. The fixing manner of the lead screw 34 to the driven gear 332 is not limited herein. The drive gear 331 and the driven gear 332 may be spur gears or helical gears. The axes of the drive gear 331 and the driven gear 332 are parallel to each other such that the central axes of the lead screw 34 and the actuator 31 are parallel to each other. The lead screw 34 and the actuator 31 are located at the same side of the transmission mechanism 33. Although the lead screw 34 is elongated and requires relatively large space, when the lead screw 34 and the actuator 31 are located at the same side of the'transmission mechanism 33, the overall length of the driving assembly can be reduced such that the driving assemblies can be received in the palm.

In one embodiment, the rotational speeds of the drive gear 331 and the driven gear 332 are the same, and the transmission ratio of the transmission mechanism 33 is 1. In an alternative embodiment, the rotational speed of the drive gear 331 is greater than the rotational speed of the driven gear 332, and the transmission ratio of the transmission mechanism 33 is greater than 1, which has a speed reduction function. In this case, the transmission mechanism 33 and the speed reduction mechanism 32 that will be described below corporately form a speed reducer, which reduces the requirement of speed ratio of the speed reduction mechanism 32, is convenient for structural design, and facilitates reduction of cost. The axis of the drive gear 331 coincides with the axis of the output shaft of the actuator 31, and the axis of the driven gear 332 coincides with the axis of the lead screw 34, so that the driving member 31 and the lead screw 34 are as close as possible, which facilitates reduction of overall width.

Referring to FIGS. 3 and 4, in one embodiment, a speed reduction mechanism 32 is provided between the actuator and the transmission mechanism 33. The speed reduction mechanism 32 is used to reduce the rotational speed transmitted to the transmission mechanism from the output shaft of the actuator 31. Specifically, the input end of the transmission mechanism 33 is fixed to the output end of the actuator, and the output end of the transmission mechanism 33 is fixed to the drive gear 331. The output end of the transmission mechanism 33 extends into the center of the drive gear 331 and is fixed to the drive gear 331 by a key, interference fit, a snap ring, or the like. In one embodiment, the speed reduction mechanism 32 is a worm drive that has a large reduction ratio. In another embodiment, the speed reduction mechanism 32 may include multi stage transmission gears. The configuration of the speed reduction mechanism 32 is not limited herein as long as required reduction ratio is satisfied. Optionally, the axis of the output end of the actuator 31 coincides with the axis of the output end of the speed reduction mechanism 32.

Referring to FIGS. 5-8, in one embodiment, a rope holder 38 is located at a side of the nut 35. The rope holder 38 includes a base 381 and, a cover 382 fixed to the base 381. The base 381 defines a groove. The rope holder 38 is used, to hold an end of a pulling rope and prevents the pulling rope from disengaging from the nut 35 when the pulling rope is pulled. The nut 35 define a space 3502 and the through liege 3501 is defined in a sidewall of the space 3502. The rope bolder 38 is received in the space 3502. With such configuration, the overall size will not increase despite provision of the rope holder 38.

In one embodiment, the base 381 and the cover 382 are connected to each other by a screw 383 or interference fit. Specifically, the base 384 includes at least one protrusion 3811 adjacent to the groove, and the cover 382 defines a recess 3820 to receiver the protrusion 3811. After the base 381 and the cover 382 are connected to each other by the screw 383, the inner side of the cover 382 press a portion of a pulling rope tightly, which fixes the pulling rope to the rope holder 38. The other end of the pulling rope passes through the through hole 3501 and extends into the thumb.

In one embodiment, the groove of the base 381 is curved and the portion of the pulling rope is received in the groove. The base 381 further includes a circular guiding member 3812 to guide the portion of the pulling rope. The number of the protrusion 3811 is two and the two protrusions 3811 are located adjacent to opposite ends of the base 381.

Figure 5:
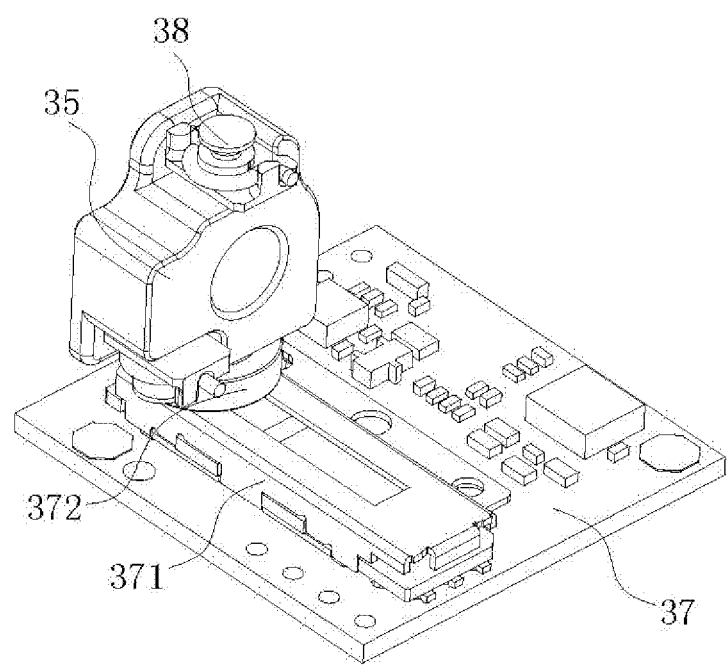
FIG. 5 is a schematic isometric view of a control circuit board of the robotic hand of FIG. 1.
Figure 6:
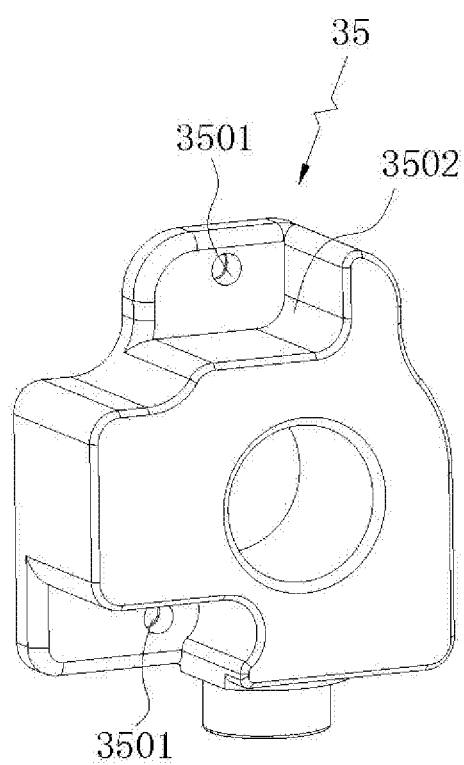
FIG. 6 is a schematic isometric view of a nut of the robotic hand of FIG. 1.
Figure 7:
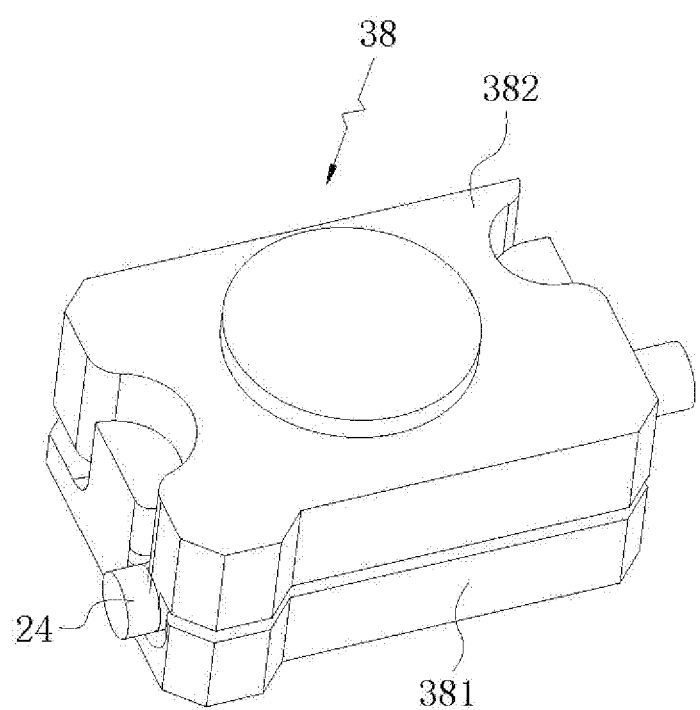
FIG. 7 is a schematic isometric view of a rope holder of the robotic hand of FIG. 1.
Figure 8:
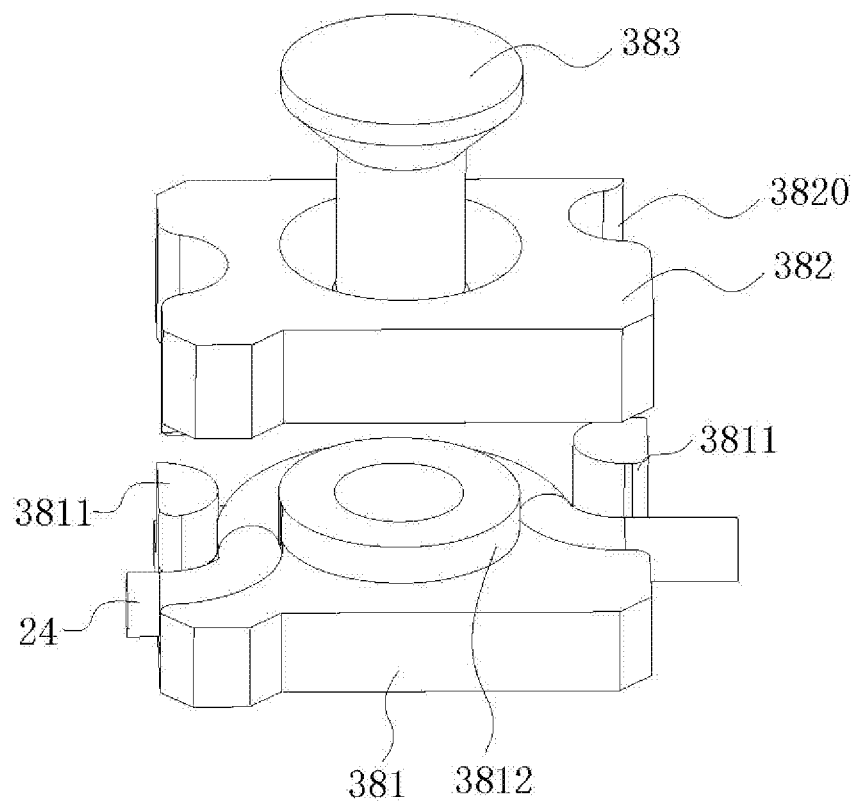
FIG. 8 is an isometric exploded view of the rope holder of FIG. 7.

Referring to FIG. 5, in one embodiment, the first driving assembly 301 further includes a control circuit board 37 for monitoring, a rotational state of the thumb 2a. The control board 37 includes a slider potentiometer 371 electrically connected thereto. The sliding contact 372 of the slider potentiometer 371 is fixed to the nut 35. The control circuit board 37 is used to control startup and shutdown of the actuator 31, and monitor the real-time position of the nut 35. The slider potentiometer 371 is electrically connected to the control circuit board 37. When the nut 35 drives the sliding contact 372 to slide, the resistance value of the slider potentiometer 371 changes, and the control circuit board 37 determines the position of the nut 35 according to the current resistance value of the slider potentiometer 371. The rotational state of the thumb 2a can then be, determined.

Referring to FIGS. 3 and 4, the first drive assembly 301 further includes a bracket 36 including a first support portion 361 for supporting the transmission mechanism 33 and a second support portion 362 for supporting the lead screw 34. The first support portion 361 and the second support portion 362 are fixed to each other. The control circuit board 37 is fixed to the bracket 36. The bracket 36 is used to support the actuator 31, the transmission mechanism 33 and the lead screw 34. Specifically, the first support portion 361 is substantially a flat plate, and the output end of the transmission mechanism 33 passes through the first support portion 361. A bearing is arranged between the first support portion 361 and the output end of the transmission mechanism 33 to rotatably support the output end of the transmission mechanism 33. The second support portion 362 is substantially cubic, and opposite ends of the lead screw 34 are rotatably connected to the first support portion 361 and the second support portion 362. A bearing is arranged in a all of the second support portion 362 for rotatably supporting the lead screw 34. The control circuit board 37 can be fixed to the first support portion 361 or the second support portion 362.

Figure 9:
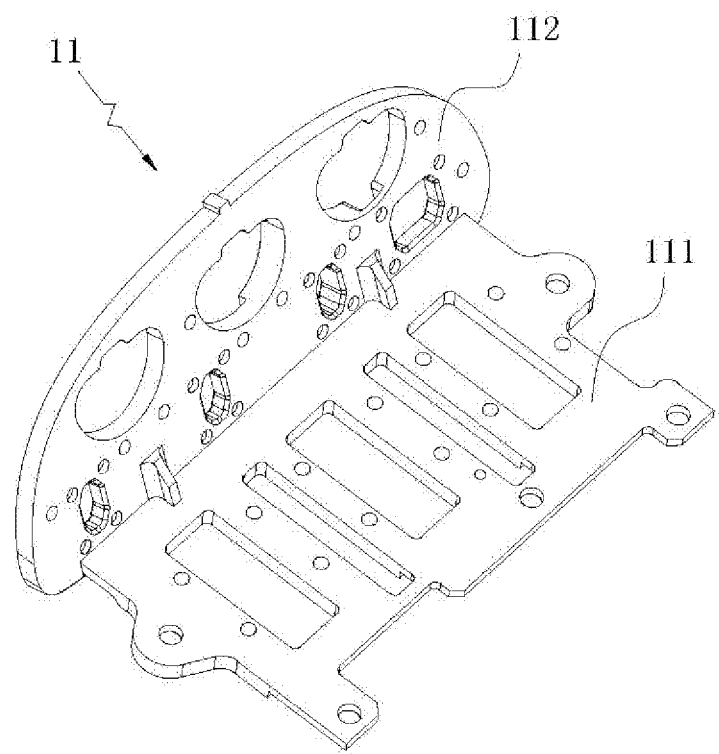
FIG. 9 is a schematic isometric view of a first plate of the robotic hand of FIG. 1.
Figure 10:
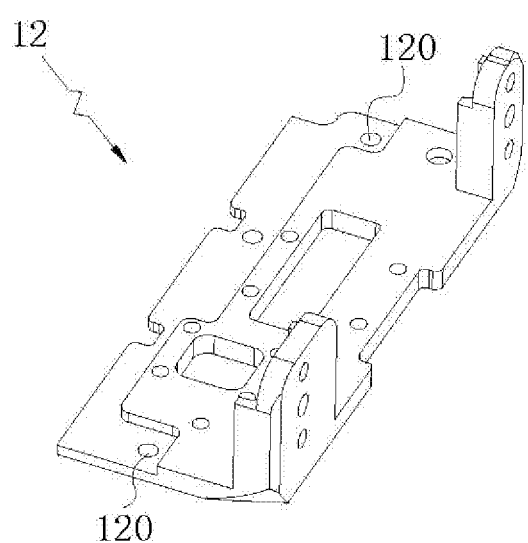
FIG. 10 is a schematic isometric view of a second plate of the robotic hand of FIG. 1.

Referring to FIGS. 9 and 10, in one embodiment, the robotic hand further includes a servo mounting member 1 arranged in the palm. The servo mounting member 1 includes a first plate 11 and a second plate 12 that are connected to each other. A mounting hole 120 for fixing the first plate 11 is defined in the second plate 12. The second driving assembly 302, the third driving assembly 303, and the fourth driving assembly 304 are all mounted on the first plate 11, and the first driving assembly 301 is mounted on the second plate 12. The first plate 11 includes a horizontal portion 111 for mounting the bracket 36 and at vertical portion 112 perpendicularly connected to the horizontal portion 111. The vertical portion 112 is arranged adjacent to the thumb 2a, and can be a part of the palm. The thumb 2a is connected to the vertical portion 112. The bracket 36 of the first driving assembly 301 is fixed to the servo mounting member 1 by fasteners such as screws and bolts. One end of the first support portion 361 is fixed to the servo mounting members 1, and a side of the second support portion 362 is fixed to the servo mounting member 1, enabling the lead screw 34 to be located closer to the servo mounting member 1 than the actuator 31. The second driving assembly 302, the third driving assembly 303, and the fourth driving assembly 304 are mounted in a way the same as those described above in relation to the first driving assembly 301, and will not be described herein again.

Figure 11:
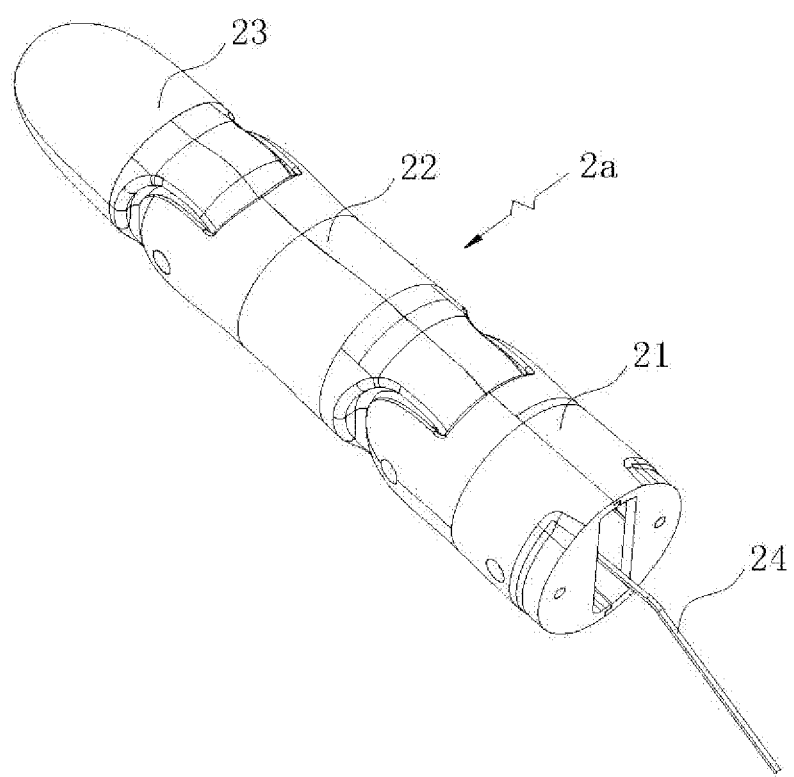
FIG. 11 is a schematic isometric view of a thumb of the robotic hand of FIG 1.
Figure 12:
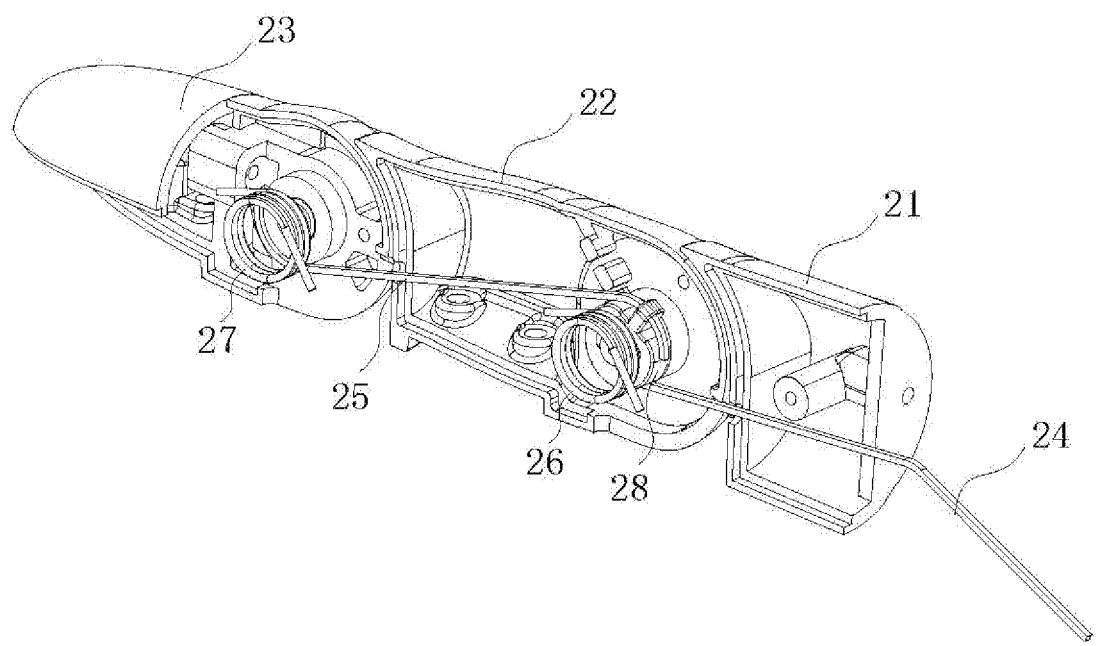
FIG. 12 is a schematic isometric view of the thumb of FIG. 11 with certain components omitted for clarity.
Figure 13:
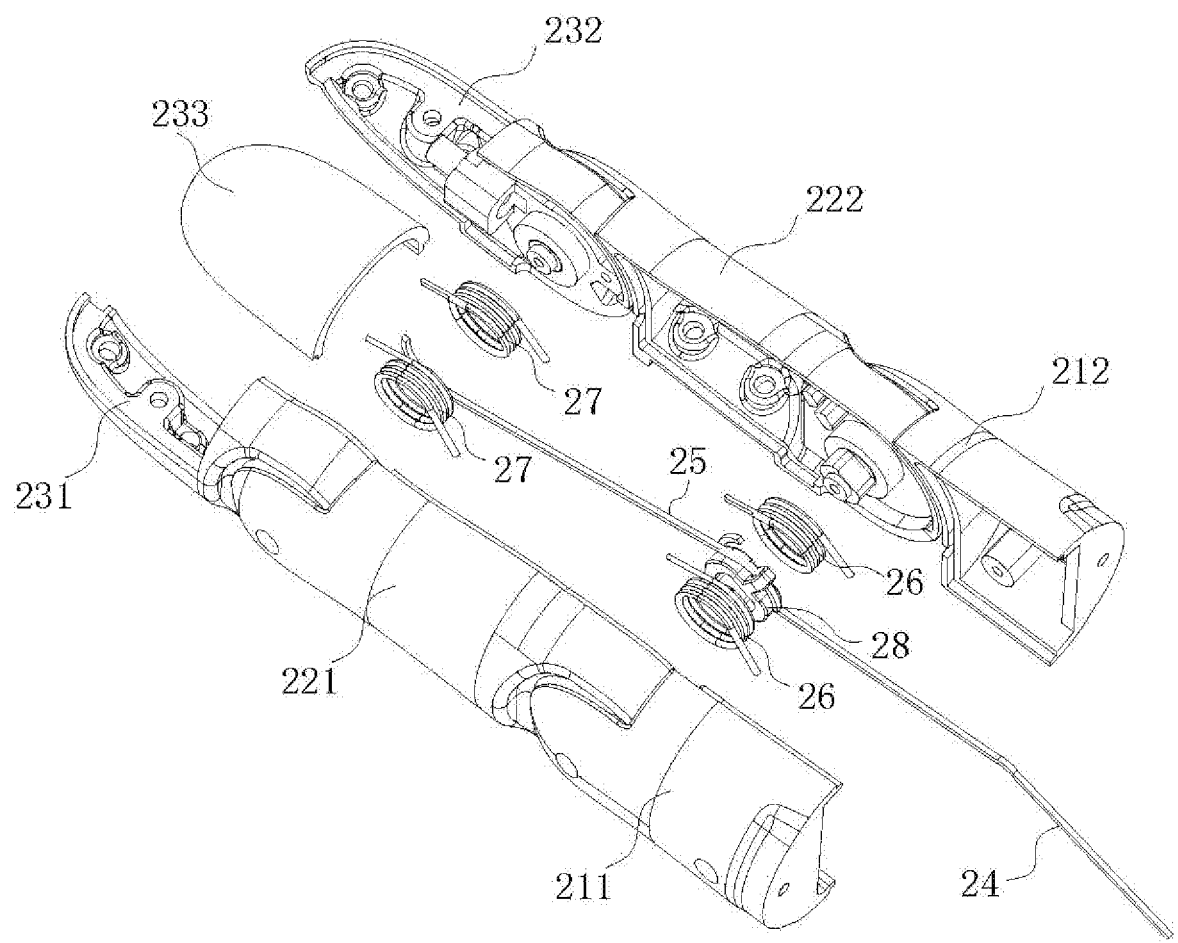
FIG. 13 is an isometric exploded view of the thumb of FIG. 11.

Referring to FIGS. 11-13, in one embodiment, the thumb 2a includes a first phalanx 21 connected to the palm, a second phalanx 22 rotatably connected to the first phalanx 21 via a shaft, and a first pulling rope 24 for driving the second phalanx 22 to rotate. A first torsion spring 26 is arranged on the shaft, and has two legs respectively abutting against the first phalanx 21 and the second phalanx 22. The first torsion spring 26 is used to apply a restoring force to the second phalanx 22. The first pulling rope 24 is flexible. One end of the first pulling rope 24 is connected to the first driving assembly 301, and an opposite end of the first pulling rope 24 extends into the first phalanx 21 and is connected to an end of the second phalanx 22. The first phalanx 21 is fixed to the vertical portion 112, and the first pulling rope 24 is fixed to a corresponding nut 35 near one end of the first driving assembly 301. For example, one end of the first pulling rope 24 adjacent to the first drive assembly 301 is fixed to the nut 35 of the first driving assembly 301. When the first driving assembly 301 is in operation, the first pulling rope 24 is pulled and then pulls the second phalanx 22 to rotate with respect to the first phalanx 21 toward the palm. When the first torsion spring 26 is in an initial state, the first phalanx 21 and the second phalanx 22 are on the same straight line, and the thumb is in an extended state. When the first driving assembly 301 pulls the first pulling rope 24, the second knuckle 22 is rotated toward the palm, and the first torsion spring 26 is twisted, which facilitates smooth rotation of the second phalanx 22. Since the first pulling rope 24 is a flexible, when a user accidentally bumps into the finger the second phalanx 22 pulls the first traction rope 24, and also drives the second phalanx 22 to rotate, which buffers the impact force of the finger on the user and prevents the user from being hurt. The second phalanx 22 can be rotated as pulled by the first pulling rope 24, which allows the thumb 2a to have a simple structure and a small size.

In one embodiment, the thumb 2a, the index finger 2b, the middle finger 2c, the ring finger 2d, and the little finger 2e have the same configuration, and the size thereof can be selected according to need.

Referring to FIGS. 11-13, in one embodiment, the thumb 2a farther includes a third phalanx 23 rotatably connected to the second phalanx 22 via an axle. A second torsion spring 27 is arranged on the axle, and includes two legs respectively abutting against the second phalanx 22 and the third phalanx 23. The second to torsion spring 27 is used to apply a restoring force to the third phalanx 23. The second phalanx 22 includes therein a second milling rope 25 for driving the third phalanx 23 to rotate. One end of the second pulling rope 25 is connected to an end of the first phalanx 21, and an opposite end of the second pulling rope 25 is connected to an end of the third phalanx 23. In the embodiment, the thumb 2a includes a first phalanx 21, a second phalanx 22, and a third phalanx 23, which is similar to a human thumb having three phalanxes. The second phalanx 22 and the first phalanx 21 are rotatably connected to each other, and the second phalanx 22 is rotatably connected to the third phalanx 23, enable the thumb to have two degrees of freedom. When the first pulling, rope 24 is pulled by the driving assembly, the second phalanx 22 is rotated with respect to the first phalanx 21. The rotation of the second phalanx 22 drives the third phalanx 23 to rotate. That is, the third phalanx 23 rotates with respect to the second phalanx 22 under the pulling of the second pulling rope 25. In this way, the second phalanx 22 and the third phalanx 23 can be simultaneously rotated by the first pulling rope 24 and the second pulling rope 25. In the embodiment, the third pulling rope 25 is a flexible rope. A user can rotate the third phalanx 23 to prevent the user from being hurt when the user accidentally bumps into the third phalanx 23.

Figure 21:
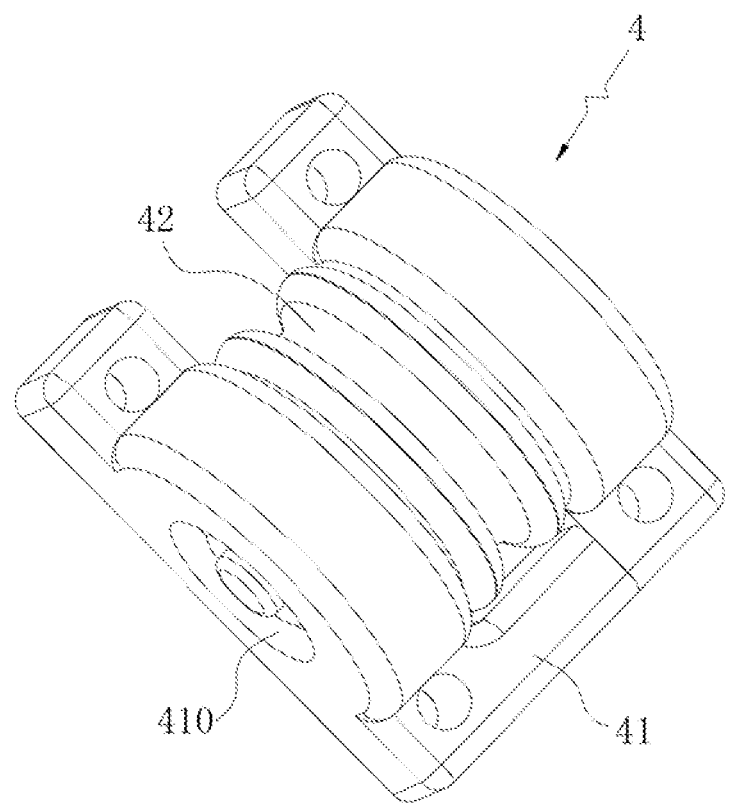
FIG. 21 is an Isometric exploded view of a winding block of the robotic hand of FIG. 1.

Referring to FIG. 21, in one embodiment, a winding block 4 is fixed to a side of the vertical portion 112 facing the first driving assembly 301. One end of the first pulling rope 24 fixed to the nut 35 through the through hole 3501, and the other end of the first pulling rope 24 abuts against the winding block 4 and extends into the first phalanx 21. The winding block 4 is used to adjust the extending direction of the first pulling rope 24, so that the first pulling rope 24 can extend into the first phalanx 21. The winding block 4 includes a base 41 fixed to the vertical portion 112, and a guiding wheel 42 rotatable connected to base bobbin 41. The base 41 is provided with a two shaft holes 410, and the guiding wheel 42 is rotatably connected to the base 41 by a shaft having opposite ends rotatably received in the shaft holes 410. The first pulling rope 24 wraps around the lateral surface of the guiding wheel 42. When the first pulling rope 24 is pulled to move, the guiding wheel 42 can be rotated to allow the first pulling rope 24 to move smoothly.

Referring to FIGS. 14-17, in one embodiment, the first phalanx 21 includes two sidewalk 214 that are spaced apart from each other, and a shaft 213 connected to and located between the two sidewalls 214. The second phalanx 22, defines a through hole 2250 that allows the shaft 213 to pass therethrough. One sidewall 214 defines a first groove 2140 to hold a leg of the first torsion spring 26 in position, and the second phalanx 22 defines a second groove 220 in a surface facing the sidewall 214 to hold the other leg of the first torsion spring 26 in position. One end of the second pulling rope 25 is connected to the shaft 213. For the thumb 2a, an end of any phalanx adjacent to the paint is referred to as head end, and the other end is referred to as tail end. The head end of the first phalanx 21 is connected to the palm, and the tail end of the first phalanx 21 is provided with the shaft 213. The shaft 213 is substantially perpendicular to the first phalanx 21. The two sidewalls 214 are respectively located at opposite ends of the shaft 213, and the head end of the second phalanx 22 is sandwiched between the two sidewalls 214. The sidewalls 214 can prevent the head end of the second phalanx 22 from sliding along the shaft 213. The first groove 2140 is shaped and sized according to one end of the first torsion spring 26. Since the first torsion spring 26 is arranged around the shaft 213, the axis of the first torsion spring 26 and the axis of the shaft 213 coincide. One end of the shaft 213 is located at the bottom of the first groove 2140.

Figure 14:
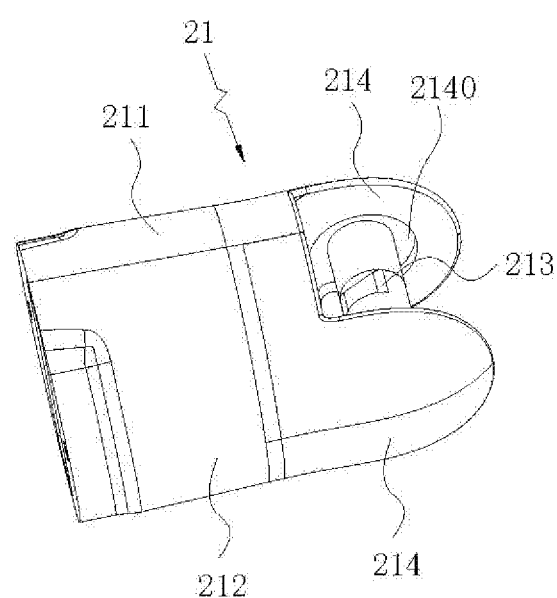
FIG. 14 is a schematic isometric view of a first phalanx of the thumb of FIG. 11.
Figure 15:
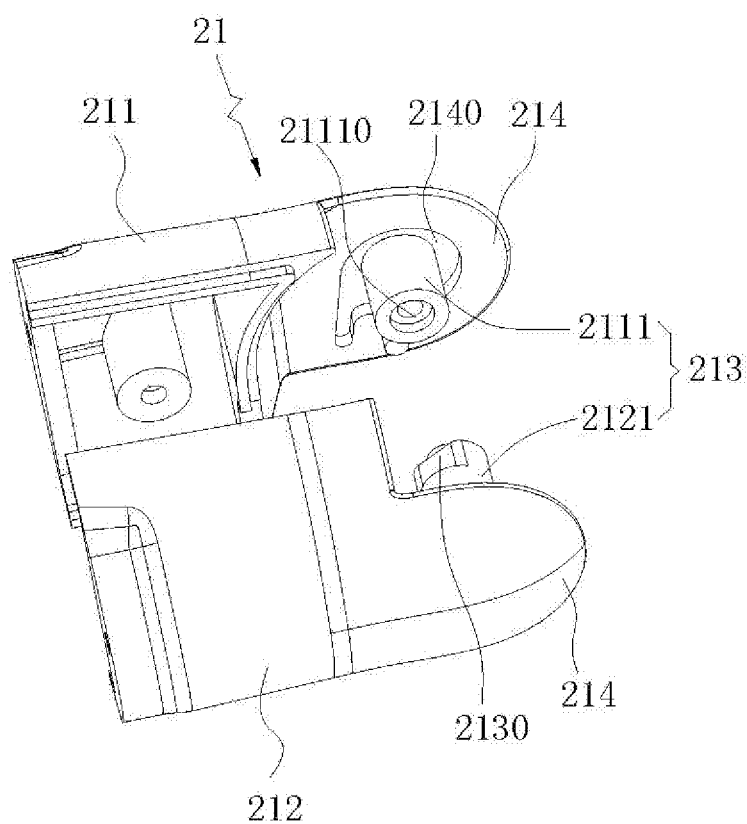
FIG. 15 is an isometric exploded view of the first phalanx of FIG. 14.

Referring to FIGS. 14 and 15, in one embodiment, the shaft 213 has a radial limiting portion 2130, and the outer circumference of the radial limiting portion 2130 is provided with a sleeve 28. One end of the second pulling rope 25 is wound around the sleeve 28, and the end of the second pulling rope 25 is fixed to the sleeve 28. Hie inner wall of the sleeve 28 is shaped and sized according to the outer circumference of the radial limiting portion 2130. The radial limiting portion 2130 is used to fix the sleeve 28 to the shaft 21 to prevent the sleeve 28 from rotating under the pulling of the second pulling rope 25. In the embodiment, the circumferential surface of the radial limiting portion 2130 includes a cylindrical surface and a planar surface. Correspondingly, the sleeve 28 defines a through hole having a cylindrical inner surface and planar inner surface, which allows the radial limiting portion 2130 to fit therein. In other embodiments, the radial limiting portion 2130 may be replaced by a groove defined in the lateral surface of the shaft 213, and the sleeve 28 can be fixed to the shaft 213 by a key fitted in the groove.

Referring to FIG. 15, in one embodiment, the first phalanx 21 includes a left housing 211 and a right housing 212 that are fixed to each other. The left housing 211 is provided with a shaft 2111 at one end, and the right housing 212 is provided with a shaft 2121 at one end. The shaft 2111 and the shaft 2121 are connected to each other to form the shaft 213. The left housing 211 and the right housing 212 may be fixed to each other by a fastener such as a screw. The two sidewalls 214 are respectively part of the left housing 211 and the right housing 212. One end of the shaft 2111 defines a socket 21110, and one end of the shaft 2121 is provided with a protrusion inserted into the socket 21110, so that the shaft 2111 and the shaft 2121 are connected to each other. The radial limiting portion 2130 is part of the shaft 2121, and the sleeve 28 is arranged around the shaft 2121, with its opposite ends respectively abutting against a step of the shaft 2121 and an end of the shaft 2111, thereby prevent axial movement of the sleeve 28.

Referring to FIGS. 14 and 15, in one embodiment, the number of the first torsion springs 26 is two, and each of the sidewalls 214 defines a first groove 2140. The number of the second grooves 220 is also two, and the two second grooves 220 are defined in opposite sides of the second phalanx 22 adjacent to an end thereof. One first groove 2140 and a corresponding second groove 220 corporately form a space for receiving one first torsion spring 26. The arrangement of the two first torsion springs 26 facilitates smooth rotation of the second phalanx 22.

Referring to FIGS. 14-17, in one embodiment, the second phalanx 22 has a first shaft receiver 225 at an inner side thereof, and the through hole 2250 extends through the first shaft receiver 225. One end of the first pulling rope 24 is wound around the outer circumference of the first shaft receiver 225. Specifically, the first shaft receiver 225 is arranged around the outer circumference of the shaft 2111 or the shaft 2121. The rotation of the second knuckle 22 is thus stable.

Figure 18:
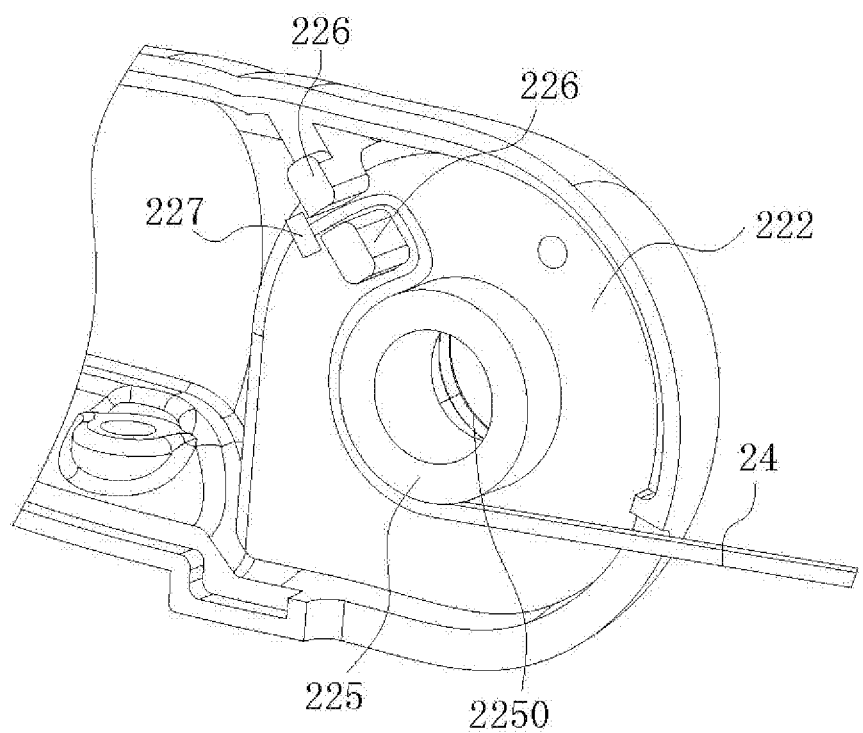
FIG. 18 is a schematic isometric view of some components of the second phalanx of the thumb of FIG. 16.

Referring to FIG. 18, in one embodiment, two protrusions 226 are located adjacent to the first shaft receiver 225. The two protrusions 226 form a gap for the first pulling rope 24 to pass therethrough. The first pulling rope 24 includes a head 227 at an end thereof, and the head 227 abuts against the two protrusions 226. Specifically, the width of the head 27 is greater than the distance of the gap between the two protrusions 226 so that the head 27 abuts against the protrusions 226 when the first pulling rope 24 is pulled from the other end, thereby preventing the end of the first pulling rope 24 having the head from moving. When the pulling rope 24 is pulled, it then pulls the second phalanx 22 to rotate. In an alternative embodiment, the head 227 may be constructed similar to the rope holder 38. A portion of the first pulling rope 24 adjacent to the head 227 wraps around the shaft receiver 225, which allows the first pulling rope 24 to apply a pulling force to the shaft receiver 225.

Figure 16:
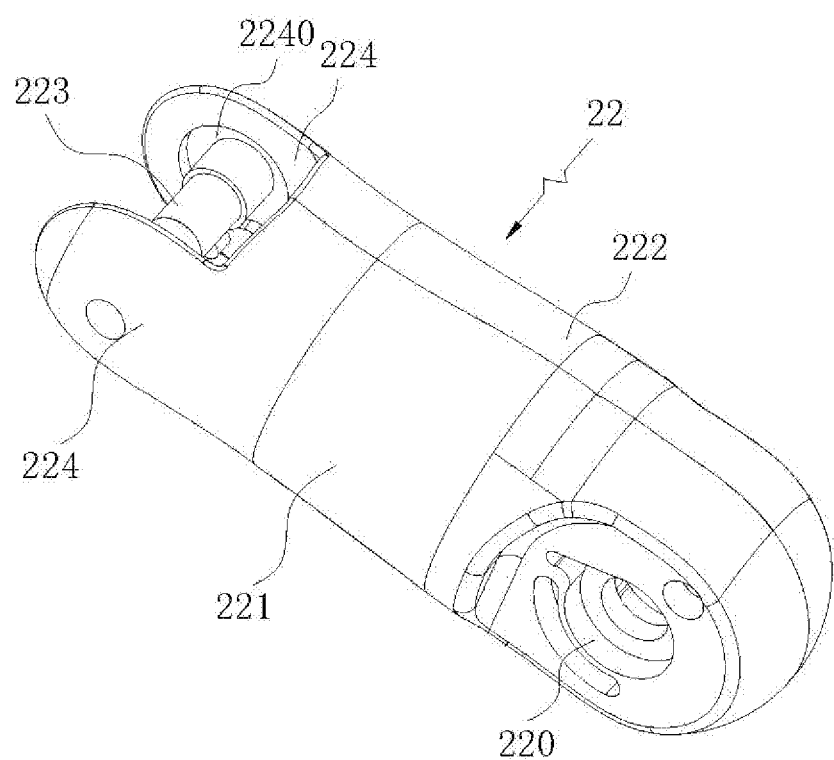
FIG. 16 is a schematic isometric view of a second phalanx of the thumb of FIG. 11.
Figure 17:
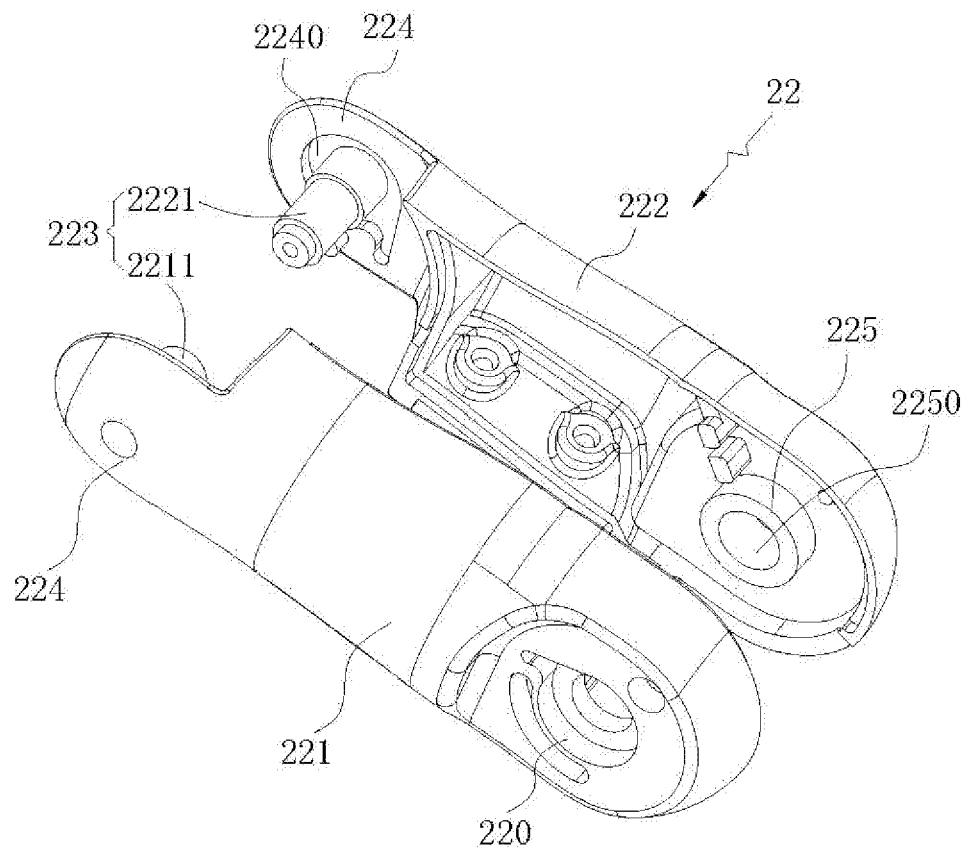
FIG. 17 is an isometric exploded view of the second phalanx of FIG. 16.

Referring to FIGS. 16 and 17, in one embodiment, the second phalanx 22 defines two recesses in opposite sides adjacent to an end thereof. The two sidewalls 214 of the first phalanx 21 are respectively received in the two recesses such that the thumb 2a can have a substantially constant diameter. The second groove 220 is defined in a bottom of the recess. The second phalanx 22 includes a left housing 221 and a right housing 222 that are fixed to each other. The head ends of the left housing 221 and the right housing 222 each define a recess. The first shaft receiver 225 can be arranged in the left housing 221 or the right housing 222.

Referring to FIGS. 16-17, in one embodiment, the second phalanx 22 includes two sidewalls 224 that are spaced apart from each other, and a shaft 223 connected to and located between the two sidewalls 224. The third phalanx 23 defines a through hole 2340 that allows the shaft 223 to pass therethrough. One sidewall 224 defines a third groove 2240 to hold a leg of the second torsion spring 27 in position, and the third phalanx 23 defines a fourth groove 230 in a surface facing the sidewall 224 to hold the other leg of the second torsion spring 27 in position. The through hole 2250 is defined in the head end of the second phalanx 22. The tail end of the second phalanx 22 includes the shaft 223 which is rotatably connected to the third phalanx 23. The head end of the third phalanx 23 is sandwiched between the two sidewalls 224 and the sidewalls 224 prevents the head end of the third phalanx 23 from sliding on the shaft 223. The third groove 2240 is shaped and sized according to one end of the second torsion spring 27. Since the second torsion spring 27 is arranged around the shaft 223, the axis of the second torsion spring 27 and the axis of the shaft 223 coincide. One end of the shaft 223 is located at the bottom of the third groove 2240.

In one embodiment, the number of the second torsion springs 27 is two, which are respectively arranged at opposite ends of the shaft 223, so that the rotation of the third phalanx 23 is more stable. Correspondingly, each sidewall 224 defines one third groove 2240, and the third phalanx 23 defines two fourth grooves 230 in opposite sides adjacent to an end thereof.

Referring to FIGS. 16-17, in one embodiment, the tail end of the second phalanx 22 includes the shaft 223. The left housing 221 includes a shaft 2211 at one end, and the right housing 222 includes a shaft 2221 at one end. The shaft 2211 and the shaft 2221 are connected to each other to form the shaft 223. The left casing 221 and the right casing 222 may be fixed to each other by a fastener such as a screw. The two sidewalls 224 are respectively part of the left housing 221 and the right housing 222. The shaft 2211 and the shaft 2 are connected to each other in a manner the same as the shaft 2111 and the shaft 2121, which will not be repeated here.

Figure 19:
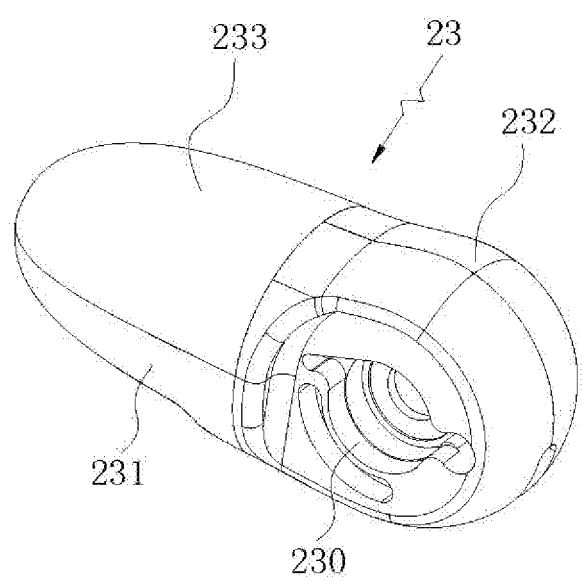
FIG. 19 is a schematic isometric view of a third phalanx of the thumb of FIG. 11.
Figure 20:
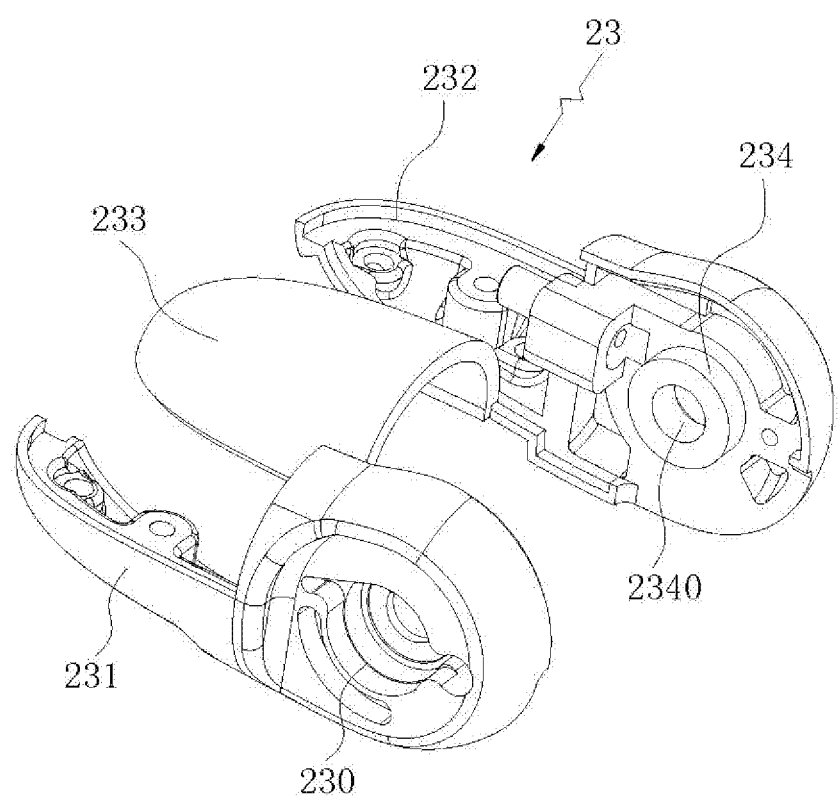
FIG. 20 is an isometric exploded view of the third phalanx of FIG. 19.

Referring to FIGS. 19-20, in one embodiment, the third phalanx 23 has a second shaft receiver 234 at an inner side thereof, and the through hole 2340 extends through the second shaft receiver 234. One end of the second pulling rope 25 is wound around the outer circumference of the second shaft receiver 234. Specifically, the first shaft receiver 225 is arranged around the outer circumference of the shaft 2111 or the shaft 2121. The rotation of the second knuckle 22 is thus stable. Opposite ends of the second pulling rope 25 are fixed in a manner the same as the end of the first pulling rope 24 away from the first driving assembly 301 is fixed.

Referring to FIGS. 19-20, in one embodiment, the third phalanx 23 includes a left housing 231, a right housing 232 and a cover 233. The left housing 231 and the right housing 232 are connected to each other by a screw. The cover 233 is fixed to the left housing 231 and the right housing 232. The head ends of the left housing 231 and the right housing 232 each define a fourth groove 230. The second shaft receiver 234 may be arranged in the left housing 231 or the right housing 232.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A robotic hand comprising;
a palm;
a thumb and four fingers that are connected to the palm;
a first driving assembly configured to drive the thumb to rotate;
a second driving assembly and a third driving assembly configured to respectively drive two of the four fingers to rotate; and
a fourth driving assembly configure to drive the other two of the four fingers to rotate;
wherein the first driving assembly, the second driving assembly, the third driving assembly, and the fourth driving assembly are received within the palm;
wherein the first driving assembly comprises an actuator, a lead screw connected to the actuator, and a nut engaged with and movable along the lead screw;
wherein the thumb comprises a first phalanx connected to the palm, a second phalanx rotatably connected to the first phalanx via a shaft, and a first pulling rope for driving the second phalanx to rotate one end of the first pulling rope is connected to the nut, and an opposite end of the first pulling. rope extends into the first phalanx and is connected to an end of the second phalanx.

2. The robotic hand according to claim 1, wherein the four fingers comprise an index finger, a middle finger, a ring finger and a little finger, the second driving assembly is configured to drive the index finger to rotate, the third driving assembly is configured to drive the middle finger to rotate, and the fourth driving assembly is configured to drive the ring finger and the little finger to rotate.

3. The robotic hand according to claim 2, wherein the second driving assembly, the third driving assembly and the fourth driving assembly are parallel to one another, and perpendicular to the first driving assembly.

4. The robotic hand according to claim 1, wherein the second driving assembly, the third driving assembly, and the fourth driving assembly have a same configuration, the configuration of the second driving assembly is symmetric with respect to a configuration of the first driving assembly.

5. The robotic hand according to claim 1, wherein the first driving assembly, the second driving assembly, the third driving assembly, and the fourth driving assembly have a same configuration.

6. The robotic hand according to claim 1, wherein the first driving assembly further comprises a transmission mechanism that comprises a drive gear connected to the actuator and a driven gear engaged with the drive gear and fixed to the lead screw, and the actuator and the lead screw are located at a same side of the transmission mechanism.

7. The robotic hand according to claim 1, wherein the first driving assembly further comprises a control circuit board for monitoring a rotational state of the thumb, the control circuit board comprises a slider potentiometer electrically connected thereto, and a sliding contact of the slider potentiometer is fixed to the nut; wherein the control circuit board is configured to determine a position of the nut according to a resistance value of the slider potentiometer.

8. The robotic hand according to claim 1, wherein a first torsion spring is arranged on the shaft, and comprises two legs respectively abutting against the first phalanx and the second phalanx, the first torsion spring is configured to apply a restoring force to the second phalanx.

9. The robotic hand according to claim 8 further comprising a second pulling rope, wherein the thumb further comprises a third phalanx rotatable connected to the second phalanx via an axle, a second torsion spring is arranged on the axle, and comprises two legs respectively abutting against the second phalanx and the third phalanx, the second torsion spring is configured to apply a restoring force to the third phalanx, one end of the second pulling rope is connected to an end of the first phalanx, and an opposite end of the second pulling rope is connected to an end of the third phalanx.

* * * * *